(12) United States Patent
Kozlov et al.

(10) Patent No.: US 9,043,267 B2
(45) Date of Patent: May 26, 2015

(54) METHODS AND SYSTEMS FOR MANAGING A DATA MINING MODEL

(75) Inventors: Alexander Kozlov, Cupertino, CA (US); Jun Li, Mountain View, CA (US); Ismail Ari, Hayward, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1142 days.

(21) Appl. No.: 11/830,791

(22) Filed: Jul. 30, 2007

(65) Prior Publication Data

US 2009/0037363 A1    Feb. 5, 2009

(51) Int. Cl.
*G06F 17/30* (2006.01)
*G06Q 10/06* (2012.01)

(52) U.S. Cl.
CPC .......... *G06Q 10/06* (2013.01); *G06F 17/30289* (2013.01); *G06F 17/30345* (2013.01)

(58) Field of Classification Search
CPC ............... G06F 17/30345; G06F 17/30289
USPC ............................................. 707/1, E17.005
See application file for complete search history.

(56) References Cited

U.S. PATENT DOCUMENTS

| | | | | |
|---|---|---|---|---|
| 6,535,868 | B1 * | 3/2003 | Galeazzi et al. | 1/1 |
| 6,920,458 | B1 * | 7/2005 | Chu et al. | 707/102 |
| 7,143,417 | B2 * | 11/2006 | Myers | 719/318 |
| 2003/0177117 | A1 * | 9/2003 | Vishnubhotla et al. | 707/5 |
| 2004/0215599 | A1 * | 10/2004 | Apps et al. | 707/2 |
| 2007/0090180 | A1 * | 4/2007 | Griffis et al. | 235/376 |

* cited by examiner

*Primary Examiner* — Shiow-Jy Fan
(74) *Attorney, Agent, or Firm* — Manisha Chakrabarti

(57) ABSTRACT

Methods, systems, and a computer readable medium storing a computer executable program for managing a data mining model are disclosed. A first notification associated with a data mining model is received at a business process system. A second notification associated with the data mining model is transmitted from the business process system responsive to the first notification. A determination is made regarding whether a first response operable to define an association between the data mining model and business data has been received at the business process system responsive to the second notification. A command is issued from the business process system to update model metadata associated with the data mining model based on the determination.

19 Claims, 10 Drawing Sheets

BASIC MODEL INFORMATION:  500

Model Identifier: 3596B3FB-7A50-4cf3-8A30-6AF0248E90C4
Model Name: Personalized Coupon Offering
Model Creation Time: March 14, 2005 12:25 PM
Model Author(s): John Doe
Model Description: To offer customer in-store coupons based on past purchase history
Data Mining Algorithm(s): Decision Tree
Model Last Updated: May 17, 2005 2:55 PM
Model Training Set: 354A1338-E25C-4481-8F41-39D052823C18

FIG. 5

MODEL SCHEMA DEFINITION:  600

Input Attribute Name: Customer
Input Attribute Data Type: String
Input Attribute Description: Customer identifier Input Attribute Name: PurchasedLast3Months
Input Attribute Data Type: Float
Input Attribute Description: Total purchases by customer from grocery store during the last three months Output Attribute Name: Top10Coupon
Output Attribute Data Type: List<Integer>
Output Attribute Description: The top 10 personalized coupons to offer to customer from in-store kiosk based on customer purchasing history

FIG. 6

MODEL ASSUMPTIONS:     700

Model Assumption: Loyalty (Customer) > 6 months
Model Assumption: Total Number Of In-Store Kiosks <= 250
Model Assumption: Product Category = Electronics
Model Assumption: Geographical Region = North America

FIG. 7

MODEL SPECIFIC KEYWORDS:     800

Model Keyword: Coupon Offering
Model Keyword: In-Store Kiosk Offering
Model Keyword: Purchase Behavior Detection

FIG. 8

MODEL PERFORMANCE EVALUATION DEFINITION:     900

Evaluation Routine Assembly: DataMiningPackage
Evaluation Routine Method: Compute ROC
Evaluation Dataset: AE1284EB-1008-43b0-94AB-E922100BE68E Evaluation Routine Assembly: DataMiningPackage
Evaluation Routine Method: Compute Retention Rate
Evaluation Dataset: FD95B1DD-A77A-4c51-A0BA-03541EDE44F2

FIG. 9

MODEL PERFORMANCE BASED EVENT TRIGGERS:
                                                          1000

Event Name: ROC Decay Notification
Evaluation Routine Assembly: DataMiningPackage
Evaluation Routine Method: Compare ROC
Evaluation Dataset: AE1284EB-1008-43b0-94AB-E922100BE68E
Threshold Value: ROC < 0.57

Event Name: Customer Retention Rate Dropped
Evaluation Routine Assembly: DataMiningPackage
Evaluation Routine Method: Compare Retention Rate
Evaluation Dataset: FD95B1DD-A77A-4c51-A0BA-03541EDE44F2
Threshold Value: Retention Rate < 0.73

FIG. 10

MODEL BUSINESS RULE DEPENDENCIES:         1100

Business Rule ID: 636BFB24-5D83-4f4b-B8C1-FE4C732B653E
Business Rule Author: Jane Smith Business Rule ID: B88F949D-4802-4fd9-9BBB-3561C2120C37
Business Rule Author: Mike Jones

FIG. 11

INTER-MODEL RELATIONSHIPS:        1200

Model Identifier: A316EDC9-A250-438d-AED8-F37E08846B37
Model Identifier: 82C1F8C6-F497-48a1-80D5-049FED00CcBEA

METHODS AND SYSTEMS FOR MANAGING A DATA MINING MODEL

FIELD OF THE INVENTION

The present invention generally relates data mining models and more particularly to methods and systems for managing a data mining model.

BACKGROUND OF THE INVENTION

Businesses routinely use business intelligence systems that involve the use of data mining models to make sense of increasingly large volumes of business data including but not limited to, for example, marketing data. A business intelligence system may at times include over a hundred operational data mining models. Business decisions made by business analysts are often based on predictions generated by such data mining models. In some cases, individual business rules are developed by business analysts for implementation based on specific predictions generated by one or more data mining models.

Effectively running a business intelligence system typically involves coordination between at least two different parties, the model administrators and the business analysts. The model administrators may include, but are not limited to, model developers, model experts, and statisticians. The model administrators develop customized data mining models, add new models to the system, monitor model performance, and/or perform model maintenance. The business analysts rely on the data mining models to make business decisions including those involving the design and updating of business rules. Business analysts typically like to be informed of changes and updates to data mining models of relevance to their business area so that they can synchronize their business decisions in accordance with the status of available data mining models.

Some prior art data mining model management systems, such as for example, SAS Enterprise Miner, Microsoft Analysis Services, Oracle Data Mining and Analytics, and Fairlsaac Model Builder provide data mining and model management platforms for model administrators. Such prior art data mining management system fail to create a unified model management framework that provides tools for facilitating interactions between model administrators and business analysts.

SUMMARY OF THE INVENTION

One aspect of the invention is directed to a method of managing a data mining model. A first notification associated with a data mining model is received at a business process system. A second notification associated with the data mining model is transmitted from the business process system responsive to the first notification. A determination is made regarding whether a first response operable to define an association between the data mining model and business data has been received at the business process system responsive to the second notification. A command is issued from the business process system to update model metadata associated with the data mining model based on the determination.

Another aspect of the invention is directed to a computer readable medium storing a computer executable program for managing a data mining model. Yet another aspect of the invention is directed to a system for managing a data mining model.

BRIEF DESCRIPTION OF THE DRAWINGS

FIG. 5 is a representative example of basic model information in an example of one embodiment of a model specific metadata associated with a data mining model;

FIG. 6 is a representative example of a model schema definition in an example of one embodiment of model specific metadata associated with a data mining model;

FIG. 7 is a representative example of model assumptions in an example of one embodiment of model specific metadata associated with a data mining model;

FIG. 8 is a representative example of model specific keywords in an example of one embodiment of model specific metadata associated with a data mining model;

FIG. 9 is a representative example of model performance evaluation definition in an example of one embodiment of model specific metadata associated with a data mining model;

FIG. 10 is representative example of model performance based event triggers of an example of one embodiment of model specific metadata associated with a data mining model;

FIG. 11 is a representative example of model business rule dependencies in an example of one embodiment of model specific metadata associated with a data mining model;

FIG. 12 is a representative example of inter-model relationships in an example of one embodiment of model specific metadata associated with a data mining model;

DETAILED DESCRIPTION OF THE DRAWINGS

Figure 1:
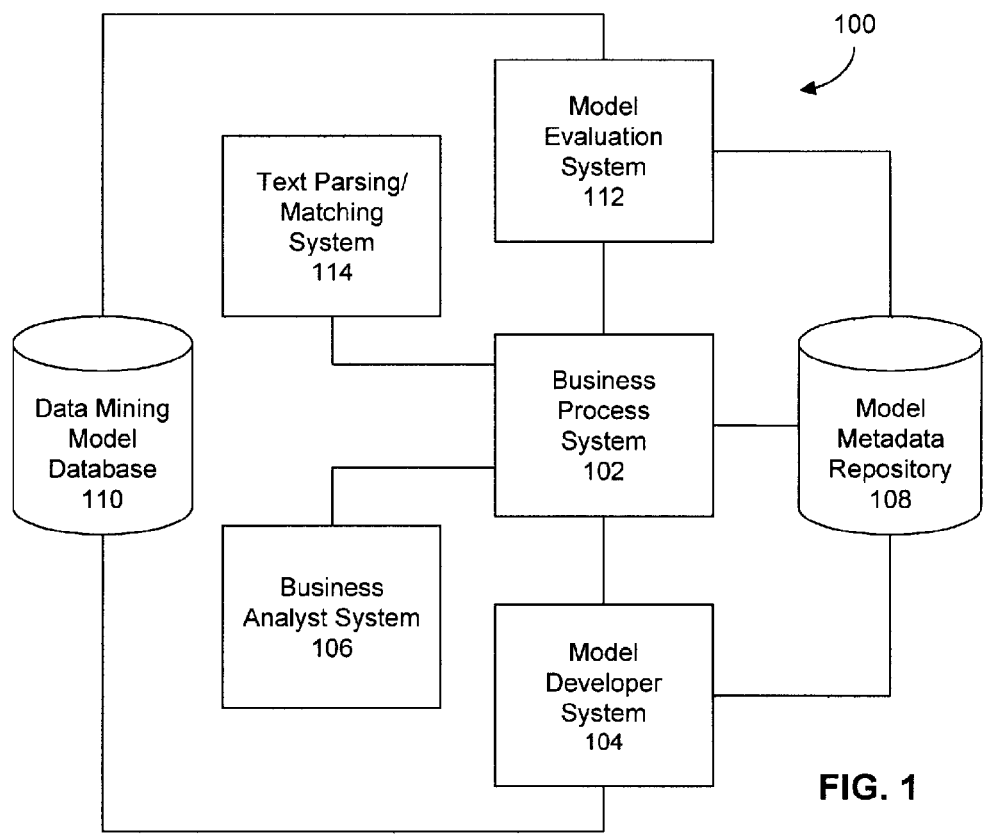
FIG. 1 is a block diagram representation of an example of a system that may be used to implement one embodiment of managing a data mining model.

Referring to FIG. 1, a block diagram representation of an example of a system 100 that may be used to implement one embodiment of data mining model management is shown. The system 100 generally includes a business process system 102, a model developer system 104, a business analyst system 106, a model metadata repository 108, a data mining model database 110, a model evaluation system 112, and a text parsing/matching system 114. The business process system 102 is communicatively coupled to the model developer system 104, the business analyst system 106, the model metadata repository 108, the model evaluation system 112, and the text parsing/matching system 114. The model developer system 104 is communicatively coupled to the model metadata repository 108 and the data mining model database 110. The model evaluation system 112 is communicatively coupled to the model metadata repository 108 and the data mining model database 110.

In one embodiment, text parsing/matching system 114 is an integrated component of the business process system 102. In one embodiment, the model evaluation system 112 is an integrated component of the business process system 102. In one embodiment, the model metadata repository 108 is an integrated component of the data mining model database 110. While a single business analyst system 106 is shown, alternative embodiments of the system 100 may include additional business analyst systems 106. While a single model developer system 104 is shown, alternative embodiments of the system 100 may include multiple model developer systems 104. In one embodiment, model developer systems 104 include one or more of model author systems, statistician systems, and model expert systems.

The business process system 102 generally coordinates communications between the model developer system 104 and the business analyst system 106. In one embodiment, the business process system 102 generally coordinates the management of data mining models stored in the data mining model database 110. In one embodiment, the business process system 102 manages one or more of model deployment, model updates, model business relationships, model evaluation, model performance monitoring, inter-model dependency relationships, and model expiration. The model developer is generally responsible for the creation, deployment, and maintenance of data mining models via the model developer station 104.

The business analyst is generally responsible for making business decisions based on predictions generated by data mining models. In one embodiment, the business analyst authors business rules based on predictions generated by data mining models via the business analyst system 106. The business process system 102 provides the business analyst with data mining model related notification via the business analyst system 106 that inform business analysts of model deployments, model changes, model updates, model expiration, and prompts to synchronize data models with business rules.

The data mining model database 110 stores one or more data mining models that have been deployed for use in the system 100. In one embodiment, the data mining model database 110 only includes actively deployed data mining models. In one embodiment, the data mining model database includes an archive of expired data mining models. The model evaluation system 112 runs one or more model evaluation routines to evaluate the status of a data mining model responsive to a request received from the business process system 102. The text parsing/matching system 114 is used to compare model specific keywords with model keywords subscribed to by one or more business analysts.

The model metadata repository 108 is generally used to store model specific metadata associated with each of the data mining models. In one embodiment, the model metadata repository 108 stores model specific metadata associated with each of the data mining models stored in the data mining database 110. In one embodiment, the model metadata repository 108 stores model specific metadata associated with data mining models actively deployed in the system 100. In one embodiment, the model metadata repository 108 includes an archive of model specific metadata associated with expired data mining models.

Figure 2:
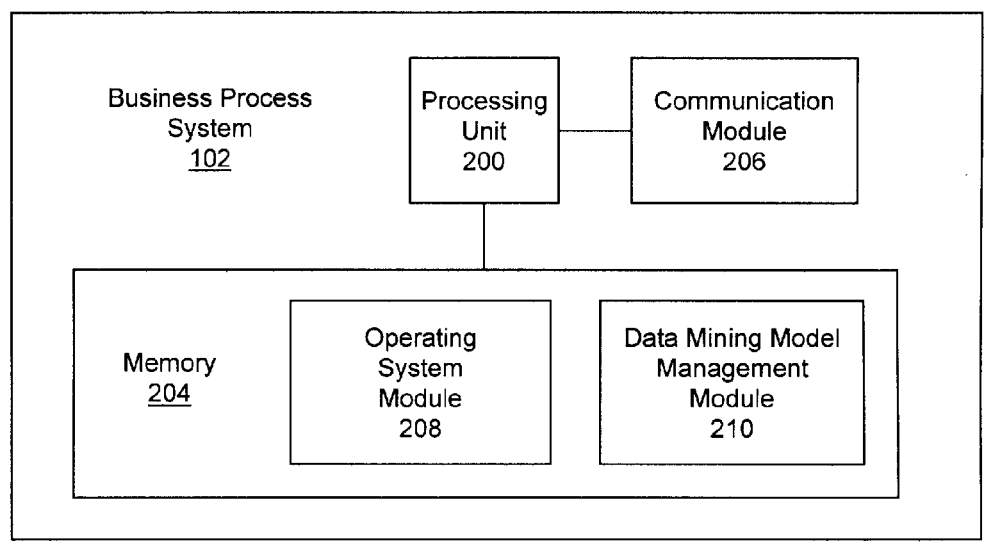
FIG. 2 is a block diagram representation of one embodiment of a business process system.

Referring to FIG. 2, a block diagram representation of one embodiment of a business process system 102 is shown. The business process system 102 generally includes a processing unit 200 communicatively coupled to a memory 204 and a communication module 206. The processing unit 200 generally includes a processor or controller. The communication module 206 generally coordinates the exchange of data between the business process system 102 and the model developer system 104, the business analyst system 106, the model metadata repository 108, the model evaluation system 112, and the text parsing/matching system 114.

The operating system module 208 and the data mining management module 210 are stored in the memory 204. Alternative embodiments may include additional modules that facilitate the performance of data mining model management functions. In one embodiment, the memory 204 includes one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices. The processing unit 200 generally retrieves and executes machine readable instructions or software programs that are stored in the memory 204.

Figure 3:
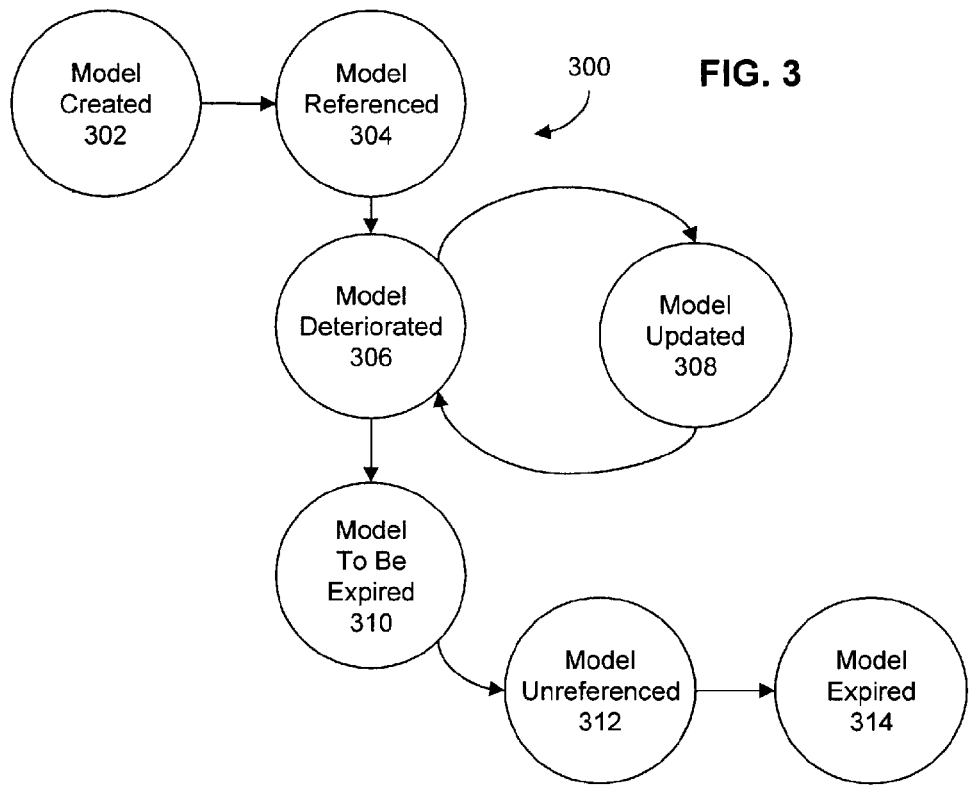
FIG. 3 is a state diagram representation of one embodiment of a lifecycle of a data mining model.
Figure 4:
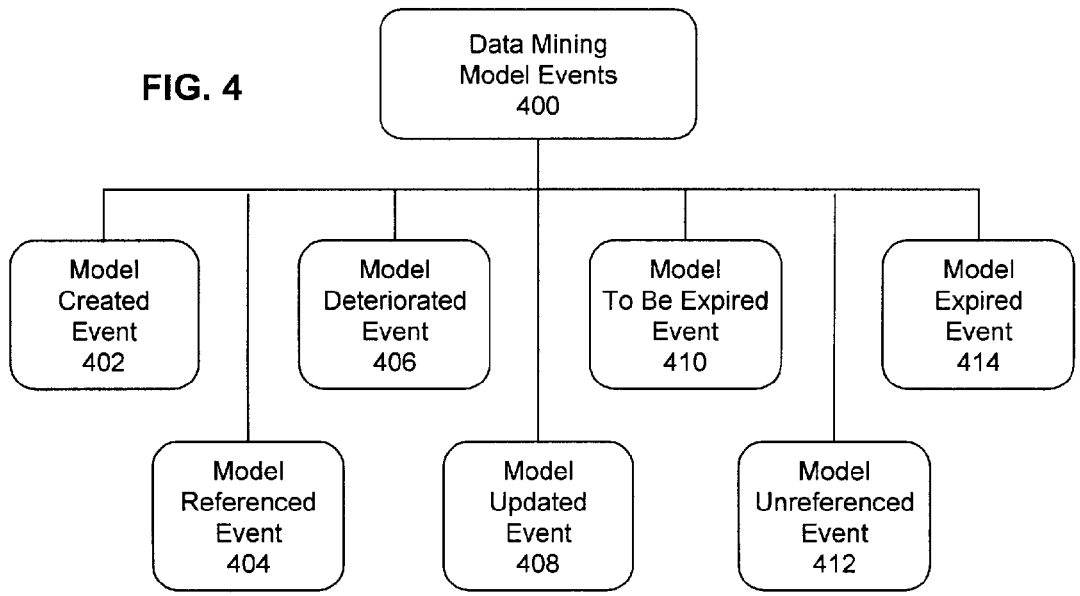
FIG. 4 is a block diagram representation of one embodiment of data mining model events associated with a data mining model.

Referring to FIG. 3, a state diagram representation of one embodiment of a lifecycle of a data mining model 300 is shown. And FIG. 4 is a block diagram representation of one embodiment of data mining model events 400 associated with the lifecycle of the data mining model detailed in FIG. 3. The business process system 102 updates the model specific metadata associated with the data mining model at the model metadata repository 108 to record the history of the data mining model.

In one embodiment, the data mining model is created by a model developer and deployed for use via the model developer system 104. In one embodiment, the data mining model is a previously created data mining module deployed for use in the system 100. The model developer designates the data mining model as a created model 302 at the model developer system 104 upon deployment of the data mining model for use by the system 100. The model developer raises a Model Created Event 402 via the model developer system 104 upon deployment of the data mining model for use in the system 100. The model developer system 104 communicates a Model Created Event notification to the business process system 102.

The business process system 102 communicates a Model Created notification to one or more business analysts via the business analyst system 106 responsive to the Model Created Event. The one or more business analysts are provided with the option of creating associations between business data and the data mining model. In one embodiment, the business analyst is provided with the option of developing business rules dependent on predictions generated by the data mining model. If a business analyst creates an association between business data and the data mining model, the data mining model is designated a referenced model 304. The business analyst raises a Model Referenced Event 404 upon the creation of an association between business data and the data mining model at the business analyst system 106. The business analyst system 106 communicates a Model Referenced Event notification to the business process system 102.

The business process system 102 establishes a schedule based on model metadata for use in the model evaluation system 112. The model evaluation system 112 executes evaluations according to the established schedule and issues commands to evaluate the data mining model. If the model evaluation system 112 determines that the performance of the data mining model has deteriorated the model evaluation system designates the data mining model as a deteriorated model 306. The deteriorated status of the data mining model is communicated to the business process system 102 and the business process system 102 responsively raises a Model Deteriorated Event 406. The business process system 102 communicates a Model Deteriorated notification to one or more model developers associated with the data mining model.

The model developer reviews the model evaluation results and determines whether the data mining model can be fixed by updating one or more model parameters. If the model developer determines that the data mining model can be fixed, the model developer updates the data mining model, designates the data mining model as an updated model 308 and raises a Model Updated Event 408 via the model developer system 104. The model developer system 104 communicates a Model Updated notification to the business process system 102. The updated model 308 is periodically evaluated and if the updated model 308 is designated as a deteriorated model 306 again, the Model Deteriorated Event 406 is raised again and the process for handling the deteriorated model 306 described above is repeated.

If the model developer determines that the data mining model cannot be fixed, the model developer designates the data mining model as a to be expired model 310 and raises the Model To Be Expired Event 410 via the model developer system 104. In one embodiment, the model developer sets a model expiration time for the data mining model. A Model To Be Expired notification is communicated from the model developer system 104 to the business process system 102. The business process system 102 communicates a Model To Be Expired notification to one or more business analysts that have previously created associations between the data mining model and business data via the business analyst system 106.

Each of the business analysts removes previously created associations between business data and the data mining model. In one embodiment, each time a business analyst removes an association between the data mining model and a business rule at the business analyst system 106, a Model Unreferenced Event 412 is raised automatically by the business analyst system 106. In one embodiment, the Model Unreferenced Event 412 is raised manually by the business analyst. The business analyst system 106 communicates a Model Unreferenced notification to the business process system 102. The business process system 102 sends a notification to one or more business analysts that have previously created associations between the data mining model and business data via the business analyst system 106. Once the business process system 102 determines that all of the business rules that previously referenced the data mining model have been removed or unreferenced, the data mining model is designated an unreferenced model 312. In one embodiment, unreferenced models 312 are expired automatically based on a pre-defined model expiration time. In one embodiment, deteriorated models 306 are left in place for future use with other datasets. In one embodiment, unreferenced models 312 are left in place for future use with other datasets.

Once the business process system 102 determines that all of the business rules that previously referenced the data mining model have been removed or unreferenced, the business process system 102 determines whether the data mining model was designated as a to be expired model 310. If the business process system 102 determines that the data mining model was previously designated as a to be expired model 310, the business process system 102 designates the data mining model as an expired model 314 and raises the Model Expired Event 414. The business process system 102 communicates a Model Expired notification to the business analysts via the business analyst system 106.

As mentioned previously, the model metadata repository 108 is generally used to store model specific metadata associated with each of the data mining models. In one embodiment, the model specific metadata includes one or more of the following model parameters: basic model information, model schema definition, model assumptions, model specific keywords, model performance evaluation definition, model performance based event triggers, model business rule dependencies, and inter-model dependencies.

In one embodiment, the basic model information includes one or more of the following basic model information data fields: a model identifier, a model name, a model creation time, one or more model authors, a model description, one or more data mining algorithm, a model last updated time, a model training set. The model identifier is a globally unique identifier assigned to a data mining model. In one embodiment, the model identifier is a machine readable name. The model name is typically a user friendly name that is used by model developers, statisticians, model experts, and business analysts to reference the data mining model. The model creation time is a timestamp indicating the time at which the data mining model was created. The model authors are the one or more model developers, statisticians, and model experts involved in the creation and maintenance of the data mining model. The model description is a textual description of the purpose of the data mining model. The listing of the one or more data mining algorithms identifies the specific data mining algorithms used to construct the data mining model. The model last updated time is a timestamp that indicates the last time that the data mining model was updated. The model training set is a set of database records based on a select statement stored in a corresponding relational statement in the model metadata repository 108.

Referring to FIG. 5, a representative example of basic model information 500 associated with an example of one embodiment of a data mining model is shown. The model identifier is 3596B3FB-7A50-4cf3-8A30-6AF0248E90C4. The model name is Personalized Coupon Offering. The model creation time 306 is Mar. 14, 2005 12:25 PM. The model author is John Doe. The model description defining the purpose of the data mining model to offer customer in-store coupons based on past purchase history. The data mining algorithm used to construct the data mining model is Decision Tree. The model was last updated on May 17, 2005 2:55 PM. The model training set used to train the data mining model is 354A1338-E25C-4481-8F41-39D052823C18. It should be noted that while one embodiment of basic model information associated with a data mining mode has been described, alternative embodiments of basic model information that include a subset of the basis model information data described above or that include other types of basic model information data beyond those described above are also considered to be within the scope of the invention.

In one embodiment, the model specific metadata includes a model schema definition. The model schema definition defines one or more input attributes received at the data mining model and the output attribute generated by the data mining model. In one embodiment, the input attribute is an input parameter retrieved from a business database or a business data table. In one embodiment, each input parameter corresponds to a column in a database table. In one embodiment, the input attribute is an aggregated input parameter. An aggregated input parameter is derived from one or more input parameters retrieved from one or more business databases or business data tables. In one embodiment, the input attribute includes a combination of one or more input parameters and one or more aggregated input parameters. In one embodiment, the output attribute is a prediction generated by the data mining model based on the input attributes.

In one embodiment, each input attribute includes one or more of the following input attribute data fields: an input attribute name, an input attribute data type, and an input attribute description. In one embodiment, each output attribute includes one or more of the following output attribute data fields: an output attribute name, an output attribute data type, and an output attribute description. In one embodiment, the input attribute description and the output attribute description provide user friendly textual descriptions of the associated input attribute and the output attribute, respectively.

Referring to FIG. 6, a representative example of a model schema definition 600 associated with an example of one embodiment of a data mining model is shown. The model schema definition includes two input attributes. The first input attribute, an input parameter, has an input attribute name Customer, an input attribute data type String and an input attribute description Customer identifier. The second input attribute, an aggregated input parameter, has an input attribute name PurchasedLast3 Months, an input attribute data type Float and an input attribute description Total purchases by customer from store during the last three months. The output attribute has an output attribute name Top10Coupon, an output attribute data type List <Integer> and an output attribute description The top 10 personalized coupons to offer to customer from in-store kiosk based on customer purchasing history. It should be noted that while one embodiment of a model schema definition has been described above, alternative embodiments of model schema definition including alternative formats for input and/or output attributes are also considered to be within the scope of the invention.

In one embodiment, the model specific metadata includes one or more model assumptions. A model developer typically develops a data mining model to operate under a pre-defined set of conditions. The pre-defined set of conditions is recorded in the associated model specific metadata as model assumptions. In one embodiment, the recorded model assumptions are accessible to model developers, model experts, and statisticians via a model developer system 104 to facilitate the evaluation, updating and/or maintenance of the data mining model. In one embodiment, the model assumptions are accessible to business analysts via a business analyst system 106 to facilitate the development of business rules based on the data mining model.

In one embodiment, the model developer identifies an initial set of model assumptions during the construction of a data mining model. In one embodiment, the model developer updates the model assumptions during the updating and maintenance of the data mining model. In one embodiment, a model assumption is an input attribute model assumption associated with an input attribute defined in the model schema definition. In one embodiment, a model assumption is an environmental model assumption that defines an environmental operating condition associated with the data mining model. In one embodiment, the model assumptions are expressed via a labeling mechanism including a first order predicate.

Referring to FIG. 7, a representative example of model assumptions 700 associated with an example of one embodiment of a data mining model is shown. A first model assumption Loyalty (Customer) >6 months is an example of an input attribute model assumption involving the first input attribute Customer defined in the model schema definition of FIG. 6. The term Loyalty is the name of the first order predicate of the first input attribute Customer. The first input attribute Customer is filtered to include only those customers that have been shopping at the store for over six months. A second model assumption model assumption Total Number Of In-Store Kiosks <=250 is an example of an environmental model assumption. A third model assumption Product Category=Electronics specifies that the data mining model is designed to provide predictions associated with the purchase of electronics. A fourth model assumption Geographical Region=North America specifies that the data mining model is designed to provide predictions associated with purchases made in North America. It should be noted that while a number of different types of model assumptions have been described above, alternative types of model assumptions are also considered to be within the scope of the invention.

In one embodiment, the model specific metadata includes one or more model specific keywords. Each data mining model is typically constructed with one or more defined purposes. In one embodiment, the model specific keywords are derived from the one or more defined purposes. In one embodiment, the model specific keywords operate to semantically link two or more of the data mining models. In one embodiment, the model specific keywords are indexed and the data mining models are searchable by model specific keyword.

Referring to FIG. 8 a representative example of model specific keywords 800 associated with an example of one embodiment of a data mining model is shown. The output attribute description in the model schema definition of FIG. 6 describes the output attribute as The top 10 personalized coupons to offer customer from an in-store kiosk based on customer purchasing history. The three model specific keywords: Coupon Offering, In-Store Kiosk Offering, and Purchase Behavior Detection are consistent with the description of the data mining model output attribute. It should be noted that while a model specific keyword based or model specific tag-based data mining model selection approach has been described above, alternative data mining model querying approaches, such as for example, a relational query approach may also be used without departing from the spirit of the invention.

In one embodiment, the model specific metadata includes a model performance evaluation definition. The model performance evaluation definition includes a listing of the evaluation routines used to evaluate the performance of the data mining model. In one embodiment, each listed evaluation routine includes one of more of the following evaluation routine data fields: an evaluation routine assembly, an evaluation routine method, and an evaluation dataset. The evaluation routine assembly is a fully qualified class name, which can be located in a predefined location, with a collection of static evaluation methods. At runtime, once the evaluation routine assembly is loaded into the running process's memory the corresponding evaluation method can be executed. The evaluation routine method defines the methodology employed by the evaluation routine. The evaluation routine dataset defines the dataset used by the evaluation routine to perform the data mining model evaluation.

Referring to FIG. 9, a representative example of a model performance evaluation definition 900 associated with an example of one embodiment of a data mining model is shown. The model performance evaluation definition 900 lists two evaluation routines to be used in the evaluation of the associated data mining model. The first evaluation routine listed specifies the use of an evaluation routine assembly DataMiningPackage, an evaluation routine method Compute ROC defined in the evaluation routine assembly DataMiningPackage, and an evaluation dataset AE1284EB-1008-43b0-94AB-E922100BE68E. The second evaluation routine listed specifies the use of an evaluation routine assembly DataMiningPackage, an evaluation routine method Compute Retention Rate, and an evaluation dataset FD95B1DD-A77A-4c51-A0BA-03541EDE44F2.

In one embodiment, the model specific metadata includes one or more model performance based event triggers. Each evaluation routine listed in the model performance evaluation definition has a counterpart performance based event trigger. After a data mining model has been evaluated in accordance with the associated model performance evaluation definition, the results of the performance evaluation are analyzed in accordance with the performance based event triggers to assess the performance status of the data mining model. In the event that a threshold value defined in the performance based trigger is passed, a Model Deteriorated Event 406 is raised.

Each performance based event trigger includes one or more of the following performance based event trigger data fields: an event name, an evaluation routine assembly, an evaluation routine method, an evaluation dataset, and a threshold value. In one embodiment, each performance based event trigger includes an event name and a threshold value. In one embodiment, each performance based event trigger includes a threshold value.

The event name is a descriptive name of the performance based evaluation trigger. The evaluation routine assembly and the evaluation routine dataset specified in the performance based event trigger are the same as those specified in the counterpart evaluation routine. The evaluation routine method specifies the methodology employed to determine whether the performance based event trigger has been triggered. The threshold value defines a threshold value and a condition where if the condition is found to be true, triggers the performance based event trigger. If the performance based event trigger is triggered, the data mining model is considered to be operating in a deteriorated state.

Referring to FIG. 10, a representative example of model performance based event triggers 1000 of an example of one embodiment of a data mining model is shown. A first performance based event trigger is associated with the first evaluation routine listed in the model performance evaluation definition of FIG. 9. The first performance based event trigger, ROC Decay Notification, specifies a threshold value ROC<0.57. The results of the first evaluation routine, Compute ROC, are compared against the threshold value of 0.57. If the computed ROC is less than 0.57, the data mining model is considered to be in operating in a deteriorated state.

A second performance based event trigger is associated with the second evaluation routine listed in the model performance evaluation definition of FIG. 9. The second performance based event trigger Customer Retention Rate Dropped specifies a threshold value Retention Rate<0.73. The results of the second evaluation routine, Compute Retention Rate, are compared against the threshold value of 0.73. If the computed Retention Rate is less than 0.73, the data mining model is considered to be operating in a deteriorated state. In one embodiment, retention rate is not specific to particular data mining models therefore the data mining models to be deteriorated by this performance based trigger are specified.

When a business analyst creates a business rule associated with a data mining model at a business analyst system 106, a globally unique business rule identifier is assigned to the newly created business rules. The model identifier associated with the data mining model and the business rule identifier associated with the newly created business rule are communicated from the business analyst system 106 to the business process system 102. The business process system 102 updates the model business rule dependencies section of the model specific metadata associated with the data mining model in the model metadata repository 108.

Each business rule listed in the model business rule dependencies includes one or more of the following data fields: a business rule identifier and one or more business rule authors. The business rule identifier is the globally unique business rule identifier and the business rule author(s) are the business analyst(s) responsible for creating the business rule.

Referring to FIG. 11, a representative example of model business rule dependencies 1100 associated with an example of one embodiment of model specific metadata associated with a data mining model is shown. The model business rule dependencies associated with the data mining model include two business rules. The first business rule lists the business rule identifier as 636BFB24-5D83-4f4b-B8C1-FE4C732B653E and the business rule author as Jane Smith. The second business rule lists the business rule identifier as B88F949D-4802-4fd9-9BBB-3561C2120C37 and the business rule author as Mike Jones.

In one embodiment, the model specific metadata includes inter-model relationships. In some cases, a data mining model may have an inter-model relationship with another data mining model. In one embodiment, the inter-model relationship is a model improved relationship. In a model improved relationship, a first data mining model back-fits a second data mining model, by having more input data. In one embodiment, the inter-model relationship involves a first data mining model using an output generated by a second data mining model as an input. The first and second data mining models typically employ different data mining algorithms. As mentioned previously, each data mining model and each dataset has a globally unique model identifier. The inter-model relationships for a first data mining model includes the model identifiers for each of the other data mining models that have an inter-model relationship with the first data mining model.

Referring to FIG. 12, a representative example of inter-model relationships 1200 in an example of one embodiment of model specific metadata associated with a first data mining model is shown. The inter-model relationships include two model identifiers associated with second and third data mining models that have an inter-model relationship with the first data mining model. The two model identifiers for the second and third data mining models are A316EDC9-A250-438d-AED8-F37E08846B37 and 82C1F8C6-F497-48a1-80D5-049FED00CcBEA, respectively.

In one embodiment upon the creation of a data mining model, the model developer transmits the newly created data mining model from the model developer system 104 to the data mining model database 110. In one embodiment, the model developer transmits the newly created data mining model from an outside model developer system to the data mining model database 110. The model developer defines the model specific metadata associated with the newly created data mining model and transmits the model specific metadata to the model metadata repository 108. In one embodiment, the model developer transmits the model specific metadata from the model developer system 110 to the model metadata repository 108.

The model developer raises a Model Created Event associated with the newly created data mining model indicating that the newly created data mining model is available for use by the system 100. In one embodiment, the Model Created Event is raised upon the addition of a newly added data mining model to the system 100. The model developer communicates a Model Created Event notification from the model developer system 104 to the business process system 102. In one embodiment, the model developer system 104 transmits the Model Created Event notification to the business process system 102. In one embodiment, the model developer system 104 transmits the Model Created Event notification to the business process system 102 by invoking the web service method published by the business process system 102.

Figure 13:
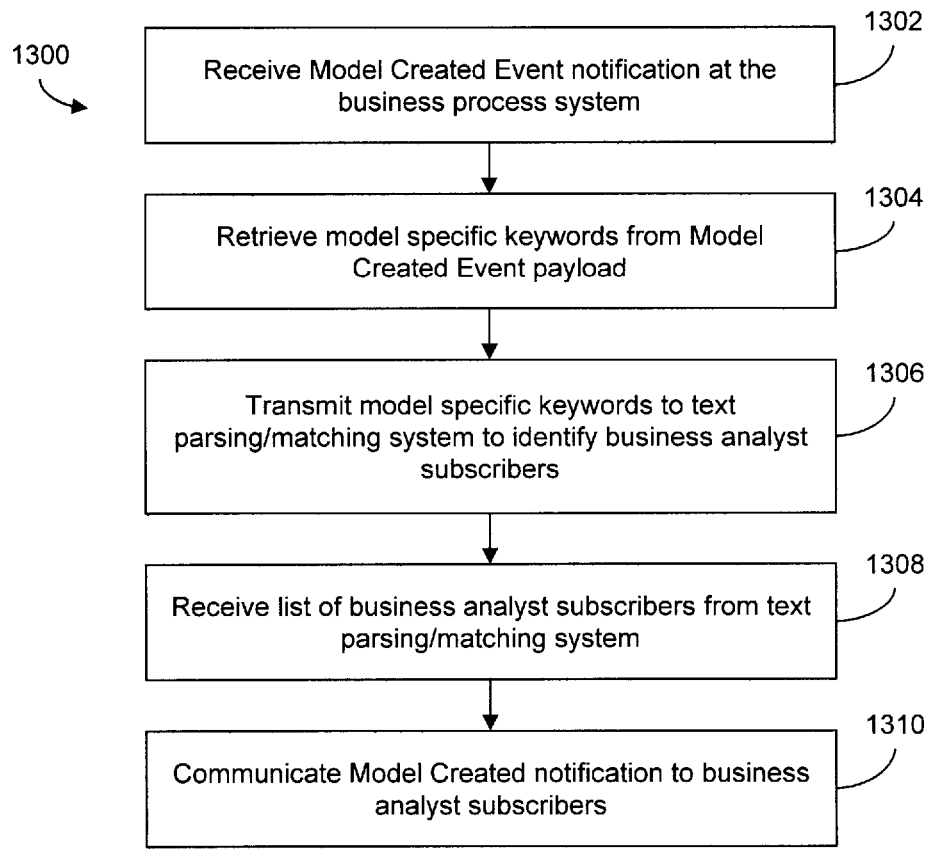
FIG. 13 is a flowchart representation of one embodiment of a method of handling a Model Created Event at a business process system.

Referring to FIG. 13, a flowchart representation of one embodiment of a method of handling a Model Created Event at the business process system 102 is shown. In one embodiment, the business process system 102 receives the Model Created Event notification at step 1302. The Model Created Event notification includes a Model Created Event payload. The Model Created Event payload includes one or more types of basic model information including a model identifier and a list of model specific keywords associated with the newly added data mining model.

A business analyst is typically involved in specific areas of a business and is therefore interested in data mining models associated with the specific areas of the business. In one embodiment, the business analyst subscribes to selected model keywords relating to the specific areas of the business. The business process system 102 retrieves the model specific keywords from the Model Created Event payload at step 1304 and transmits the retrieved model specific keywords to the text parsing/matching system 114 to identify the business analyst subscribers to the model specific keywords at step 1306.

The text parsing/matching system 114 performs a textual parsing of the model specific keywords and a matching of the model specific keywords to business analyst specific model keywords. The text parsing/matching system 114 identifies the business analyst subscribers associated with the model specific keywords based on identified matches between the model specific keywords and the business analyst specific keywords. The text parsing/matching system 114 transmits the identities of the business analyst subscribers to the business process system 102. The identities of the business analyst subscribers are received by the business process system 102 at step 1308.

The business process system 102 communicates a Model Created notification associated with the newly added data mining model to the business analyst subscribers identified by the text parsing/matching system 114 at step 1310. In one embodiment, the business process system 102 transmits the Model Created notification to the business analyst system 106. In one embodiment, the business process system 102 transmits the Model Created notification to the business analyst system 106 by invoking the web service method published by the business analyst system 106.

Upon the receipt of the Model Created notification at the business analyst system 106, the business analyst inspects the data mining model and if desired, develops one or more business rules associated with the data mining model. The business analyst raises the Model Referenced Event at the business analyst system 106. In one embodiment, the business analyst manually raises the Model Referenced Event at the business analyst system 106. In one embodiment, the Model Referenced Event is automatically raised by the business analyst system 106 upon recognition of the creation of a business rule associated with a data mining model.

The business analyst system 106 communicates a Model Referenced Event notification to the business process system 102. In one embodiment, the business analyst system 106 transmits the Model Referenced Event notification to the business process system 102. In one embodiment, the business analyst system 106 transmits the Model Referenced Event notification to the business process system 102 by invoking the web service method published by the business process system 102.

Figure 14:
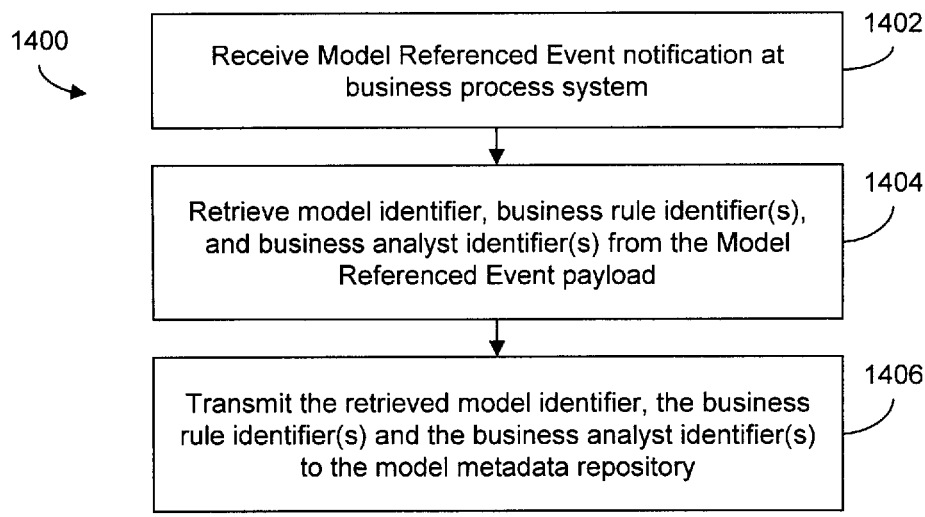
FIG. 14 a flowchart representation of one embodiment of a method of handling a Model Referenced Event at a business process system.

Referring to FIG. 14, a flowchart representation of one embodiment of a method 1400 of handling a Model Referenced Event at the business process system 102 is shown. The business process system 102 receives the Model Referenced Event notification at step 1402. The Model Referenced Event notification includes a Model Referenced Event payload. In one embodiment, the Model Referenced Event payload includes a model identifier, one or more business rule identifiers, and one or more business analyst identifiers of business analysts responsible for authoring each of the business rules.

The business process system 102 retrieves the model identifier, the business rule identifier(s), and the business analyst identifier(s) from Model Referenced Event payload at step 1404. The business process system 102 transmits the retrieved model identifier and the business rule identifier(s) and the business analyst identifier(s) for the business analysts responsible for authoring each of the business rules to the model metadata repository 108 for storage at step 1406.

The model metadata repository 108 identifies the model specific metadata associated with the received model identifier. The model metadata repository 108 stores the received business rule identifier(s) and associated business analyst identifier(s) in the model business rule dependencies section of the identified model specific metadata. When future model events arise with respect to the data mining model associated with the business rules, the business analysts responsible for authoring the business rules are notified of such model events by the business process system 102.

Figure 15:
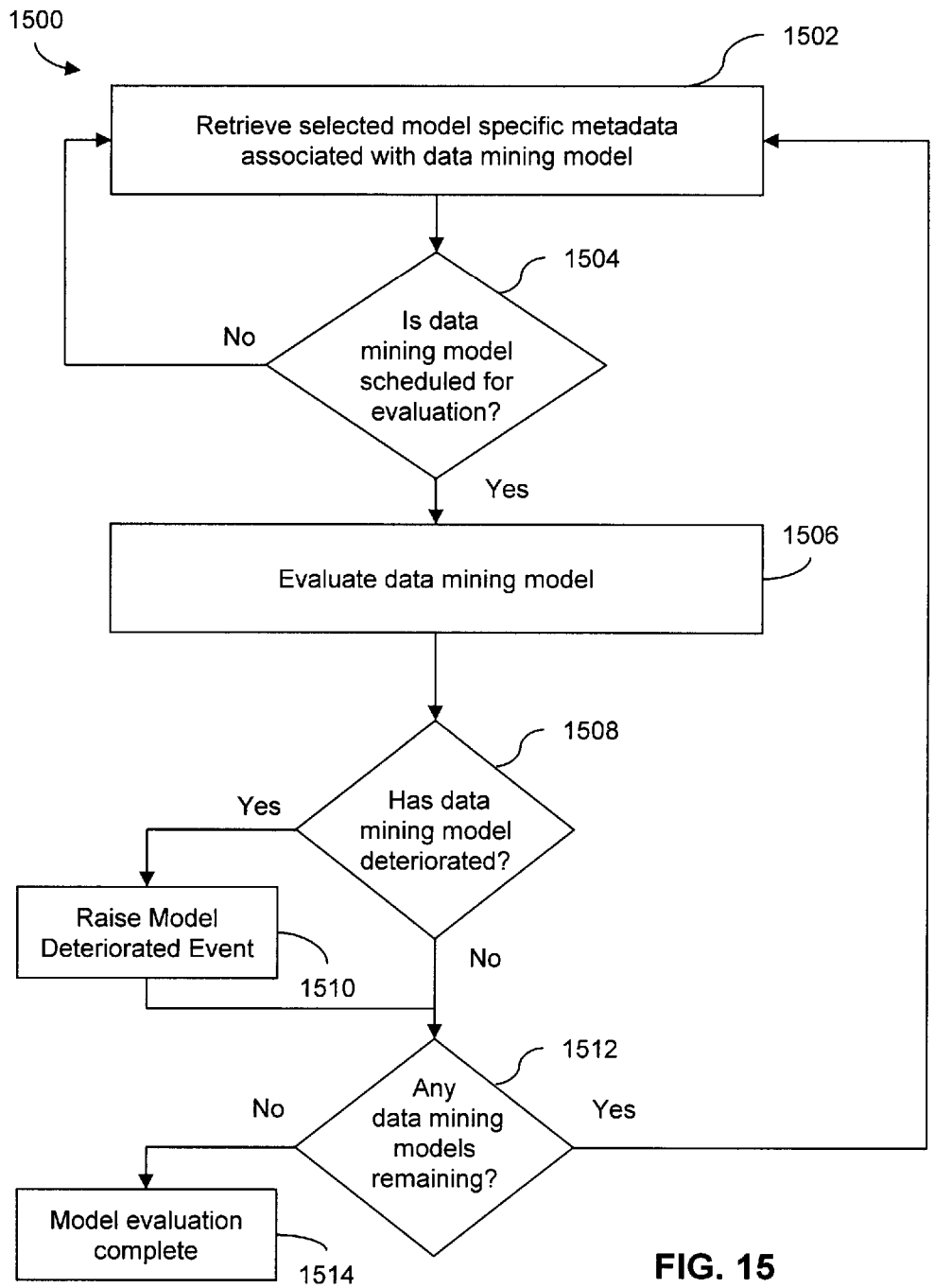
FIG. 15 is a flowchart representation of one embodiment of a method of evaluating data mining models.

Referring to FIG. 15, a flowchart representation of one embodiment of a method 1500 of evaluating data mining models is shown. The model evaluation system 112 initiates an evaluation of the data mining models deployed in the system 100. In one embodiment, the model evaluation system 112 initiates the evaluation process based on an evaluation schedule established by the business process system 102. The business process system 102 establishes a schedule based on model metadata for use by the model evaluation system 112. The model evaluation system 112 executes evaluations according to the established schedule and issues commands to evaluate the data mining model. In one embodiment, the model evaluation system 112 initiates the evaluation process responsive to the received event based trigger. In one embodiment, the business process system 102 receives an event based trigger. The received event based trigger is communicated to the model evaluation system 112. In one embodiment, the model evaluation system 112 initiates the evaluation process responsive to a web service call.

The model evaluation system 112 retrieves selected model specific metadata associated with a first data mining model from the model metadata repository 108 at step 1502. The retrieved model specific metadata includes an evaluation policy parameter. The model evaluation system 112 reviews the evaluation policy parameter and determines whether the first data mining model is scheduled for evaluation at step 1504. If the model evaluation system 112 determines that the first data mining model is not scheduled for evaluation, the model evaluation system 112 returns to step 1502 and retrieves the selected model specific metadata for the next data mining model from the model metadata repository 108. If the model evaluation system 112 determines that the first data mining model is scheduled for evaluation, the model evaluation system 112 evaluates the first data mining model at step 1506.

The model evaluation system 112 retrieves selected model specific metadata from the model metadata repository 108 including the model performance evaluation definition. The model performance evaluation definition includes a listing of the evaluation routines used to evaluate the data mining model. As mentioned previously each evaluation routine listing includes an evaluation routine assembly, an evaluation routine method, and an evaluation dataset. The model evaluation system 112 runs each of the listed evaluation routines and populates a model performance table for with the performance results generated by the model evaluation routines for the first data mining model.

The model evaluation system 112 retrieves selected model specific metadata from the model metadata repository 108 including the model performance based triggers. Each performance based event trigger includes a threshold value. The model evaluation system 112 compares each of the performance results against the defined threshold values. If any of the conditions defined by the threshold values in the model performance based triggers are found to be TRUE, the first data mining model is designated as a deteriorated model. If the conditions defined by the threshold values of the model performance based triggers are all found to be FALSE, the performance status of the first data mining model remains designated as an operational model.

A determination is made at step 1508 regarding whether the first data mining model has deteriorated. If the data mining model remains designated as an operational, the method 1500 proceeds to step 1512. In one embodiment, if the first data mining model has been designated as deteriorated by the model evaluation system 112, the Model Deteriorated Event 406 is raised by the model evaluation system 112 at step 1510 and a Model Deteriorated Event notification is communicated to the business process system 102. The method 1500 proceeds to step 1512. In one embodiment, if the first data mining model has been designated as deteriorated by the model evaluation system 112, the deteriorated status of the first data mining model is communicated to the business process system 102 and the business process system 102 responsively raises the Model Deteriorated Event 406 at step 1510. The method 1500 proceeds to step 1512.

At step 1512, a determination is made regarding whether there are any data mining models awaiting evaluation. In one embodiment, the model evaluation system 112 determines whether there are any additional data mining models awaiting evaluation at step 1512. In one embodiment, the business process system 102 determines whether there any additional data mining models are awaiting evaluation at step 1512. If there are data mining models awaiting evaluation, the method returns to step 1502 and the model evaluation process is repeated for the next data mining model. If there are no data mining models awaiting evaluation, the model evaluation is considered to be complete at step 1514.

In one embodiment, one particular way used to structure and define the performance evaluation methods and evaluation criteria is defining a static function in a library for each performance evaluation. The evaluation dataset used by the evaluation routine is specified for each performance evaluation. The model evaluation system 112 retrieves each performance evaluation at runtime. The performance evaluation results are stored in a model performance table for future performance inspection. The business process system 102 scans through the performance evaluation results, compares each of the performance results against the threshold values and raises a Model Deteriorated Event for the data mining model if the performance criteria evaluated as TRUE. The performance evaluation result is stored in a dataset and is specified as part of the event routine specification.

Figure 16:
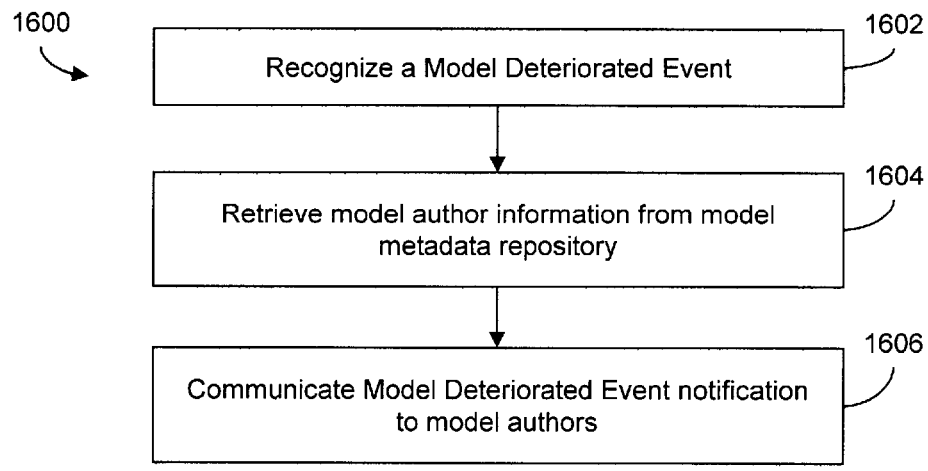
FIG. 16 is a flowchart representation of one embodiment of a method of handling a Model Deteriorated Event at a business process system.

Referring to FIG. 16, a flowchart representation of one embodiment of a method 1600 of handling a Model Deteriorated Event at the business process system 102 is shown. The business process system 102 recognizes a Model Deteriorated Event for a data mining model at step 1602. The business process system 102 retrieves selected model specific metadata associated with the data mining model including the model author(s) of the data mining model from the model metadata repository 108 at step 1604. In one embodiment, the model authors include the model developer(s), the model expert(s) and/or the statistician(s) involved in the creation and/or maintenance of the data mining model.

The business process system 102 communicates a Model Deteriorated notification associated with the deteriorated data mining model to the one or more identified model authors at step 1606. In one embodiment, the business process system 102 transmits the Model Deteriorated Event notification to the model developer system 104. In one embodiment, the business process system 102 transmits the Model Deteriorated Event notification to the model developer system 104 by invoking the web service method published by the model developer system 104.

In one embodiment, the Model Deteriorated Event notification includes a model performance access link. The model performance access link provides the model author(s) with access to the model performance results generated by the model evaluation system 112 for the deteriorated data mining model. In one embodiment, the model performance access link is a button. In one embodiment, the model performance access link is a URL.

The model author determines whether the deteriorated data mining model can be fixed by updating one or more model parameters such as for example, including but not limited to, one or more internal model parameters. If the model author determines that the deteriorated data mining model can be fixed by updating one or more model parameters, the model author updates the model parameters, designates the data mining model as an updated model, and raises a Model Updated Event at the model developer system 104.

A Model Updated Event notification is communicated from the model developer system 104 to the business process system 102. In one embodiment, the model developer system 104 transmits the Model Updated Event notification to the business process system 102. In one embodiment, the model developer system 104 transmits the Model Updated Event notification to the business process system 102 by invoking the web service method published by the business process system 102.

Figure 17:
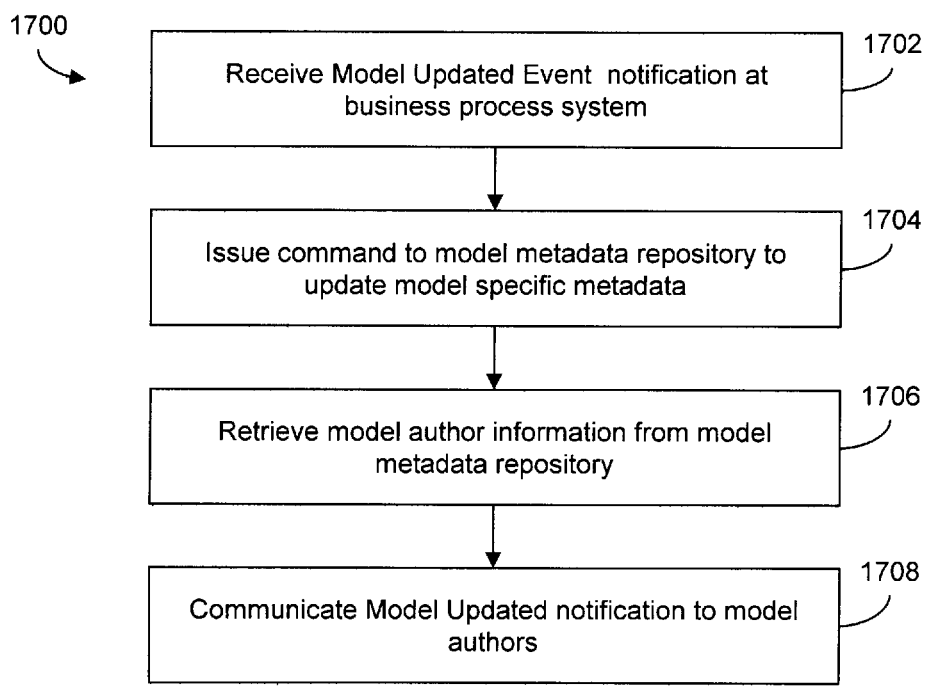
FIG. 17 is a flowchart representation of one embodiment of a method of handling a Model Updated Event at a business process system.

Referring to FIG. 17, a flowchart representation of one embodiment of a method 1700 of handling a Model Updated Event at the business process system 102 is shown. The Model Updated Event notification is received at the business process system 102 at step 1702. The business process system 102 issues a command to the model metadata repository 108 to update the model specific metadata associated data mining model to reflect that the data mining model has been updated at step 1704. In one embodiment, the business process system 102 issues a command to update the model last updated field of the basic model information section of the model specific metadata.

In some cases, one of several model authors involved in the creation and/or maintenance of the data mining model may have performed the model updates. In one embodiment, all of the model authors associated with the data mining model are informed that the data mining model has been updated. The model author information is stored in the basic model information section of the model specific metadata. The business process system 102 retrieves the model author information the model metadata repository 108 at step 1706. In one embodiment, the model authors include the model developer(s), the model expert(s) and/or the statistician(s) involved in the creation and/or maintenance of the data mining model.

The business process system 102 communicates a Model Updated notification associated with the updated data mining model to the model authors at step 1708. In one embodiment, the business process system 102 transmits the Model Updated notification to the model developer system 104. In one embodiment, the business process system 102 transmits the Model Updated notification to the model developer system 104 by invoking the web service method published by the model developer system 104.

If the model author determines that the deteriorated data mining model cannot be fixed, the model author designates the data mining model as a to be expired data mining model and raises a Model To Be Expired Event at the model developer system 104. In one embodiment, a data mining model is considered unfixable if the terms, products and/or concepts associated with the data mining model have become obsolete. In one embodiment, the model author sets a model expiration time for the deteriorated data mining model.

A Model To Be Expired Event notification is communicated from the model developer system 104 to the business process system 102. In one embodiment, the Model To Be Expired Event notification is transmitted from the model developer system 104 to the business process system 102. In one embodiment, the model developer system 104 invokes the web service method published by the business process system 102 and transmits the Model To Be Expired Event notification via this web service invocation.

Figure 18:
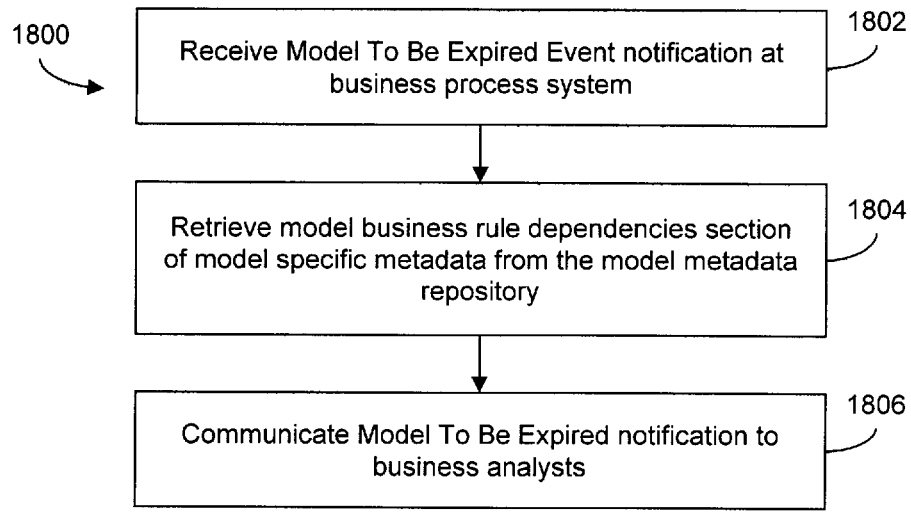
FIG. 18 is a flowchart representation of one embodiment of a method of handling a Model To Be Expired Event at a business process system.

Referring to FIG. 18, a flowchart representation of one embodiment of a method 1800 of handling a Model To Be Expired Event at the business process system 102 is shown. The Model To Be Expired Event notification is received at the business process system 102 at step 1802. The business process system 102 retrieves the model business rule dependencies section of the model specific metadata associated with the deteriorated data mining model at step 1804. As mentioned previously, each business rule listed in the model business rule dependencies includes a business rule identifier and a business rule author. The business rule identifier is the globally unique business rule identifier and the business rule author is the business analyst responsible for creating the business rule.

The business process system 102 communicates a Model To Be Expired notification associated with the deteriorated data mining model to each of the business analysts listed in the model business rule dependencies section at step 1806. In one embodiment, the Model To Be Expired notification includes the model expiration time for the to be expired model. In one embodiment, the Model To Be Expired Event notification is transmitted from the business process system 102 to the business analyst system 106. In one embodiment, the business process system 102 invokes the web service method published by the business analyst system 106 and transmits the Model To Be Expired Event notification via the web service invocation.

When the business analysts receive the Model To Be Expired notification, each business analyst removes the associations between the business rules authored by the business analyst and the to be expired data mining model. When a business analyst removes an association between one or more business rules and the data mining model, the business analyst raises a Model Unreferenced Event.

The business analyst communicates a Model Unreferenced Event notification to the business process system 102. In one embodiment, the Model Unreferenced Event notification is transmitted from the business analyst system 106 to the business process system 102. In one embodiment, the business analyst system 106 invokes the web service method published by the business process system 102 and transmits the Model Unreferenced Event notification via the web service invocation.

Figure 19:
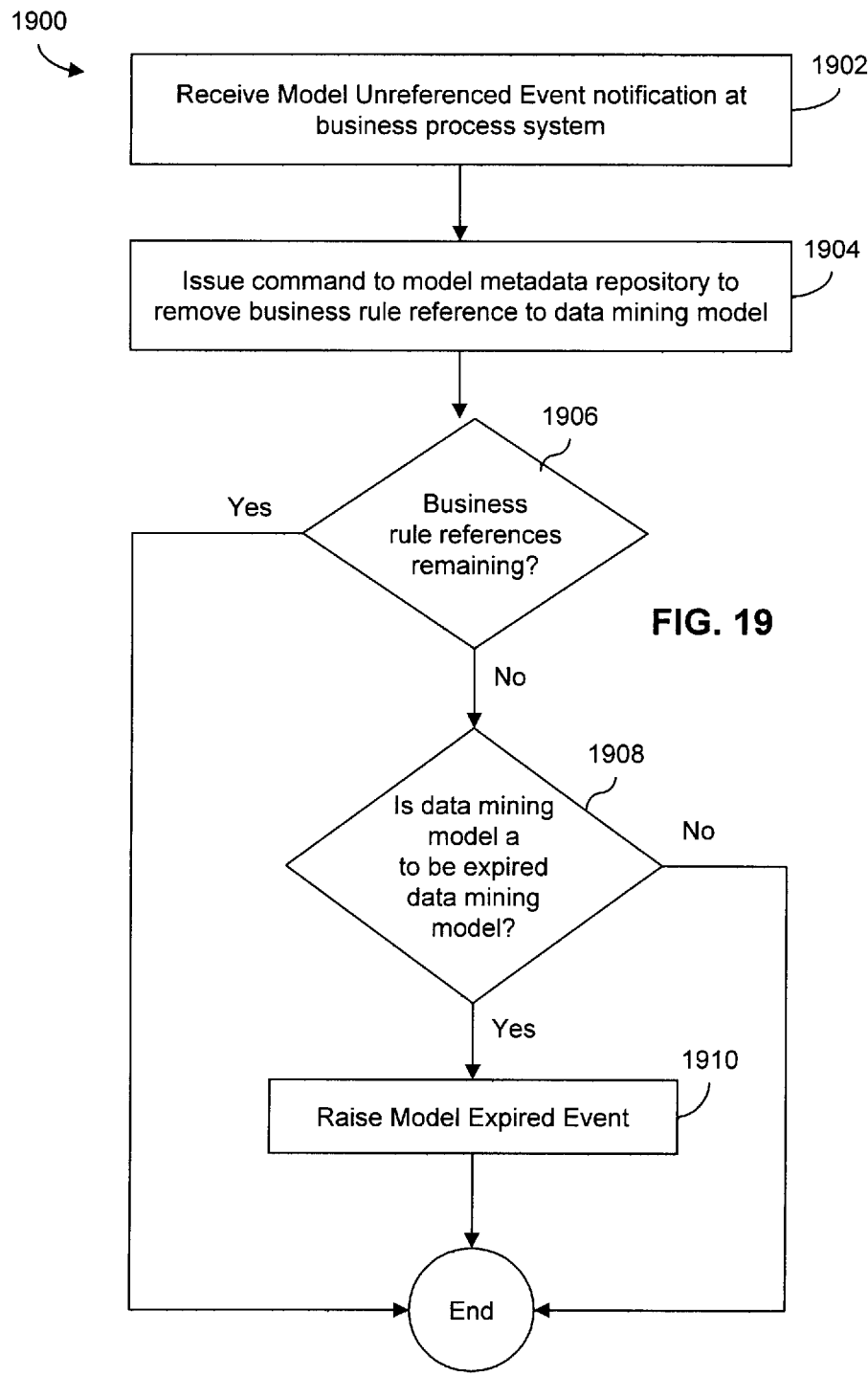
FIG. 19 is a flowchart representation of one embodiment of a method of handling a Model Unreferenced Event at a business process system.

Referring to FIG. 19, a flowchart representation of one embodiment of a method 1900 of handling a Model Unreferenced Event at the business process system 102 is shown. The business process system 102 receives the Model Unreferenced Event notification at step 1902. The Model Unreferenced Event notification payload includes the model identifier for the data mining model and business rule identifiers for one or more business rules that has been unreferenced by the business analyst. The business process system 102 issues a command to the model metadata repository 108 to remove the reference to the business rule from the model specific metadata associated with the data mining model at step 1904. More specifically, the business process system 102 issues a command to remove the business rule listing from the model business rule dependencies section.

The business process system 102 retrieves the model business rule dependencies associated with the data mining model from the model metadata repository 108 and determines whether there are any business rule references to the data mining model remaining at step 1906. If the business process system 102 determines that there are business rule references to the data mining model remaining, the method 1900 ends.

If the business process system 102 determines that there are no business rule references to the data mining model remaining the business process system 102 determines whether the data mining model is a to be expired data mining model at step 1908. Step 1908 is performed to ensure that the Model Unreferenced Event was not raised by a business analyst responsive to the removal of a business rule from an operational data mining model. If the business process system 102 determines that the data mining model is not a to be expired data mining model, the method 1900 ends. If the business process system 102 determines that the data mining model is a to be expired data mining model, the business process system 102 designates the data mining model as an expired model and raises the Model Expired Event and the method 1900 ends.

In one embodiment, once a data mining model has been designated an expired model, the performance of the data mining model is no longer evaluated and business analysts can no longer reference the data mining model and/or develop business rules that are dependent on the expired model. In one embodiment, the business process system 102 removes the model specific metadata associated with the expired data mining model from the model metadata repository 108 and stores the model specific metadata in a model metadata archive repository.

Figure 20:
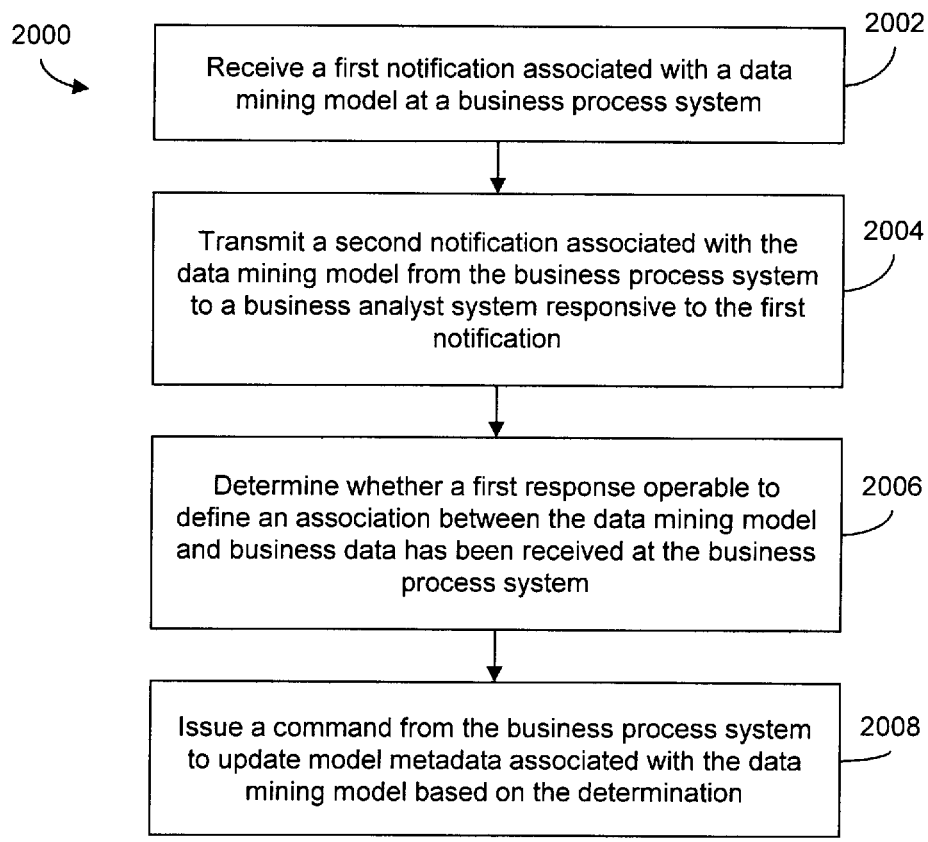
FIG. 20 is a flowchart representation of one embodiment of a method of managing a data mining model.

Referring to FIG. 20, one embodiment of a method 2000 of managing a data mining model is shown. A first notification associated with a data mining model is received at the business process system at step 2002. Examples of the first notification include, but are not limited to, a model created notification and a model to be expired notification.

A second notification associated with the data mining model is transmitted from the business process system 102 to the business analyst system 106 responsive to the first notification at step 2004. Examples of the second notification include, but are not limited to, a model created notification and a model to be expired notification.

A determination is made regarding whether a first response operable to define an association between the data mining model and business data has been received at the business process system 102 at step 2006. Examples of a first response operable to define an association between the data mining model and the business data include, but are not limited to, a model referenced association and a model unreferenced association.

A command is issued from the business process system 102 to update the model metadata associated with the data mining model based on the determination at step 2008. In one embodiment, a model metadata repository 108 is communicatively coupled to the business process system and is operable to store model specific metadata associated with the data mining model. The business process system 102 updates the model metadata associated with the data mining model that is stored in the model metadata repository 102.

While the steps in the method 2000 have been described in a particular order, the steps may be performed in a different order or additional steps may be performed in addition to the described steps without departing from the spirit of the invention.

In one embodiment, a computer readable medium stores a computer executable program for managing a data mining model. The computer readable medium includes computer readable code for receiving a first notification associated with a data mining model at a business process system, computer readable code for transmitting a second notification associated with the data mining model from the business process system responsive to the first notification, computer readable code for determining whether a first response operable to define an association between the data mining model and business data has been received at the business process system responsive to the second notification, and computer readable code for issuing a command from the business process system to update model specific metadata associated with the data mining model based on the determination.

It should be noted that while systems implemented using software or firmware executed by hardware have been described above, those having ordinary skill in the art will readily recognize that the disclosed systems could be implemented exclusively in hardware through the use of one or more custom circuits, such as for example, application-specific integrated circuits (ASICs) or any other suitable combination of hardware and/or software.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A method of managing a data mining model, the method comprising:
    receiving a first notification associated with a data mining model at a business process system, the first notification received from a model developer system;
    transmitting, in response to the first notification, a second notification associated with the data mining model from the business process system to a business analyst system;
    determining whether a first response operable to define an association between the data mining model and business data has been received from the business analyst system at the business process system, the first response responsive to the second notification;
    issuing a command from the business process system to update model specific metadata associated with the data mining model based on the determination;
    issuing from a model evaluation system a command to evaluate the data mining model, the model evaluation system generating a model performance status associated with the data mining model; and issuing a command from the business process system to update model specific metadata associated with the data mining model based on the model performance status.

2. The method of claim 1, wherein receiving a first notification associated with a data mining model comprises receiving a first notification selected from a group consisting of a model created notification and a model to be expired notification.

3. The method of claim 1, wherein transmitting a second notification associated with the data mining model comprises transmitting a second notification selected from a group consisting of a model created notification and a model to be expired notification.

4. The method of claim 1, further comprising:
retrieving at least one model specific keyword associated with the data mining model;
identifying a business analyst associated with the at least one of the model specific keywords; and
transmitting the second notification associated with the data mining model from the business process system to the business analyst system associated with the identified business analyst.

5. The method of claim 1, wherein determining whether a first response operable to define an association between the data mining model and business data has been received at the business process system comprises determining whether a first response operable to define an association selected from a group consisting of a model referenced association and a model unreferenced association has been received at the business process system.

6. The method of claim 1, further comprising:
determining whether the model performance status is a model deteriorated status; and
issuing a model performance notification associated with the data mining model from the business process system to the model developer system based on the determination.

7. The method of claim 6, further comprising:
receiving a third notification associated with the data mining model from the model developer system at the business process system;
making a first determination regarding whether the third notification is a model updated notification associated with the data mining model;
updating the model specific metadata associated with the data mining model based on the first determination;
making a second determination regarding whether the third notification includes a model expiration status associated with the data mining model; and
issuing a model expiration status notification from the business process system to the business analyst system based on the second determination.

8. The method of claim 1, further comprising providing a model metadata repository operable to be communicatively coupled to the business process system and operable to store model specific metadata associated with the data mining model.

9. The method of claim 8, wherein providing a model metadata repository comprises providing a model metadata repository operable to store model specific metadata selected from a group consisting of a basic model information, a model schema definition, a model assumption, a model specific keyword, a model performance evaluation definition, a model performance event trigger, a model business rule dependency, and an inter-model dependency.

10. A non-transitory computer readable medium for storing a computer executable program for managing a data mining model, the computer readable medium comprising:
computer readable code for receiving a first notification associated with a data mining model at a business process system, the first notification received from a model developer system;
computer readable code for transmitting, in response to the first notification, a second notification associated with the data mining model from the business process system to a business analyst system;
computer readable code for determining whether a first response operable to define an association between the data mining model and business data has been received from the business analyst system at the business process system, the first response responsive to the second notification;
computer readable code for issuing a command from the business process system to update model specific metadata associated with the data mining model based on the determination;
computer readable code for issuing from a model evaluation system a command to evaluate the data mining model, the model evaluation system generating a model performance status associated with the data mining model; and
computer readable code for issuing a command from the business process system to update model specific metadata associated with the data mining model based on the model performance status.

11. The computer readable medium of claim 10, wherein the computer readable code for receiving a first notification associated with a data mining model comprises computer readable code for receiving a first notification selected from a group consisting of a model created notification, and a model to be expired notification.

12. The computer readable medium of claim 10, wherein the computer readable code for transmitting a second notification associated with the data mining model comprises computer readable code for transmitting a second notification selected from a group consisting of a model created notification and a model to be expired notification.

13. The computer readable medium of claim 10, further comprising:
computer readable code for retrieving at least one model specific keyword associated with the data mining model;
computer readable code for identifying a business analyst associated with the at least one of the model specific keywords; and
computer readable code for transmitting the second notification associated with the data mining model from the business process system to the business analyst system associated with the identified business analyst.

14. The computer readable medium of claim 10, wherein the computer readable code for determining whether a first response operable to define an association between the data mining model and business data has been received at the business process system comprises computer readable code for determining whether a first response operable to define an association selected from a group consisting of a model referenced association and a model unreferenced association has been received at the business process system.

15. The computer readable medium of claim 10, further comprising:
computer readable code for determining whether the model performance status is a model deteriorated status; and computer readable code for issuing a model performance notification associated with the data mining model from the business process system to the model developer system based on the determination.

16. The computer readable medium of claim 15, further comprising:
    computer readable code for receiving a third notification associated with the data mining model from the model developer system at the business process system;
    computer readable code for making a first determination regarding whether the third notification is a model updated notification associated with the data mining model;
    computer readable code for updating the model specific metadata associated with the data mining model based on the first determination;
    computer readable code for making a second determination regarding whether the third notification includes a model expiration status associated with the data mining model; and
    computer readable code for issuing a model expiration status notification from the business process system to the business analyst system based on the second determination.

17. The computer readable medium of claim 10, further comprising computer readable code for storing model specific metadata associated with the data mining model at a model metadata repository, the model metadata repository being communicatively coupled to the business process system.

18. The computer readable medium of claim 17, wherein the computer readable code for storing model specific metadata associated with the data mining model at a model metadata repository comprises storing model specific metadata selected from a group consisting of a basic model information, a model schema definition, a model assumption, a model specific keyword, a model performance evaluation definition, a model performance event trigger, a model business rule dependency, and an inter-model dependency.

19. A system for managing a data mining model, comprising:
    a processor; and
    a memory, comprising computer-executable instructions that, when executed by the processor, cause the processor to:
        receive a first notification associated with a data mining model at a business process system, the first notification received from a model developer system;
        transmit, in response to the first notification, a second notification associated with the data mining model from the business process system to a business analyst system;
        determine whether a first response operable to define an association between the data mining model and business data has been received from the business analyst system at the business process system, the first response responsive to the second notification;
        issue a command from the business process system to update model metadata associated with the data mining model based on the determination;
        issue from a model evaluation system a command to evaluate the data mining model, the model evaluation system generating a model performance status associated with the data mining model; and
        issue a command from the business process system to update model specific metadata associated with the data mining model based on the model performance status.

\* \* \* \* \*